United States Patent Office 3,154,885
Patented Nov. 3, 1964

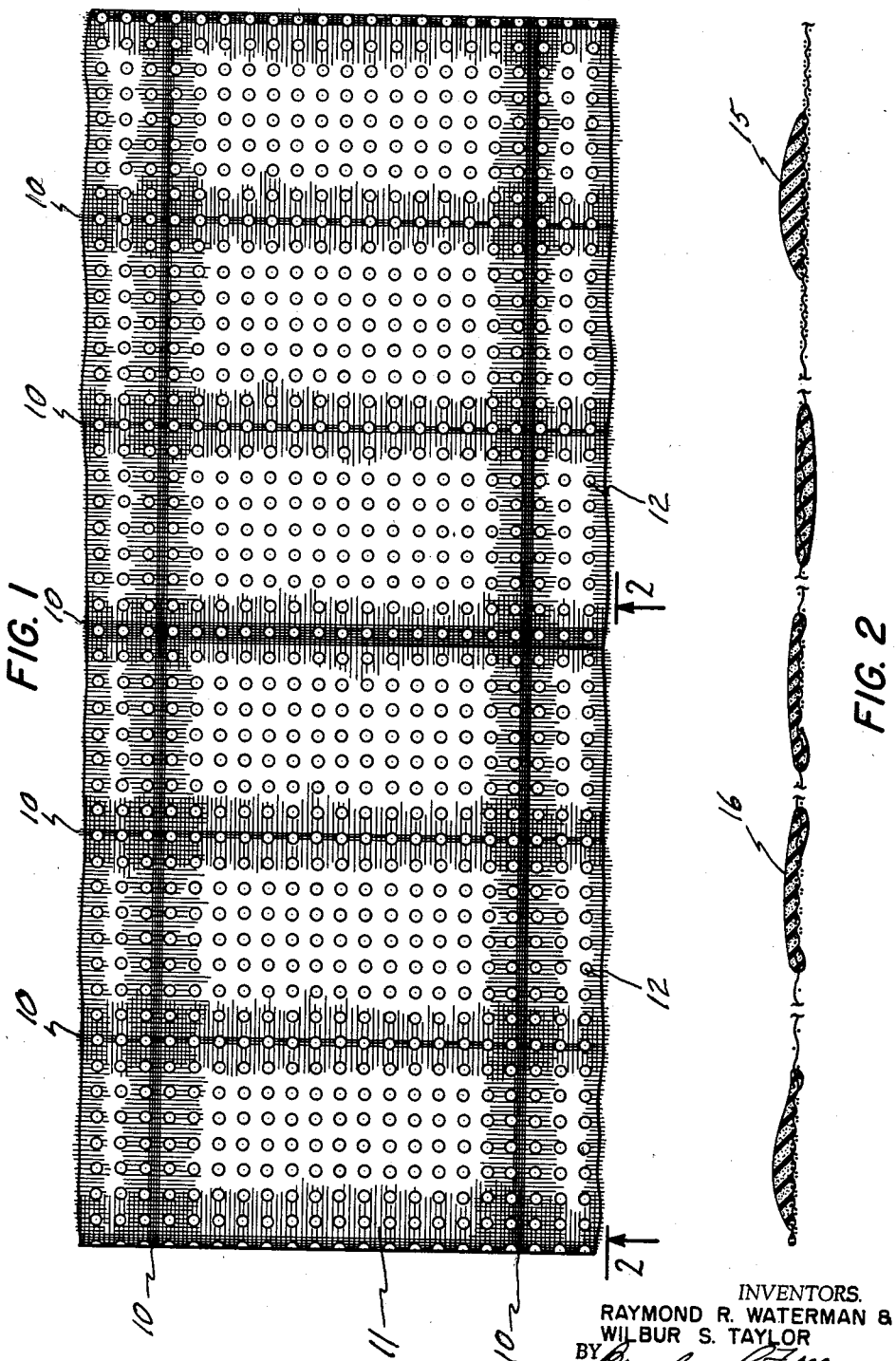

3,154,885
COMPOSITION AND APPARATUS FOR
AIR PURIFICATION
Raymond R. Waterman, Easton, and Wilbur S. Taylor, Norwalk, Conn., assignors to R. T. Vanderbilt Company, Inc., New York, N.Y., a corporation of New York
Filed Apr. 17, 1962, Ser. No. 188,236
12 Claims. (Cl. 47—26)

The present invention pertains to a composition and product for purifying air which are particularly useful for removing ozone and other air pollutants that cause weather fleck damage to plants.

Weather fleck appears suddenly as small, scattered brown spots which turn white or gray within about 24 hours. The lower, more mature leaves of the plant are affected first, then the damage may appear over the plant in a matter of days. Fleck is considered to be due to abnormally large concentrations of ozone in the air, the outbreak of weather fleck commonly occurring about 24 hours after high incidence of ozone. Other factors operating in conjunction with high ozone are presence in the air of other pollutants, such as hydrocarbons and their oxidation products (alcohols, aldehydes), hydroperoxides and other peroxygen compounds; the presence of nitrogen oxides in the air; the presence of moisture in the soil, in the air or on the plant leaves; and a period of bright sunlight following the exposure to ozone. It appears that one or more of these factors may operate in conjunction with ozone to produce severe fleck damage. Severe fleck damage completely ruins tobacco for use as cigar wrappers.

Many plant species other than tobacco also suffer weather fleck injury much as tobacco does, with a general tendency for sensitivity to increase with age of the tissue, most heavy damage being to the palisade cells (injury to the top surface of the leaf), and where the mesophyll is undifferentiated, the injury is equally apparent on either surface of the leaf. Where injury is severe, holes are punched clear through the leaf. Small grains, alfalfa, spinach and citrus fruits are damaged by ozone. Broccoli leaves develop conspicuous tumors when exposed to ozone. Symptoms have been observed on a wide range of plant species growing near several large metropolitan centers which produce the air pollutants which trigger ozone damage.

Heretofore, attempts to prevent weather fleck damage have consisted mainly in spraying or dusting the plants with a weather fleck preventive, for example, by aerial dusting. Such alleviative or preventive treatments are time consuming, are costly, provide protection for only a short duration with a single treatment, and require repetitive applications to extend effectiveness. Moreover, such treatments result in the deposition of the weather fleck preventive directly upon the plants. This results in residual deposits of the weather fleck preventive upon the plants and hence chemicals which are excellent weather fleck preventives cannot be used on plants for human usage when the chemicals are deleterious to humans, such as suspected carcinogens.

It is, therefore, an object of the present invention to provide a composition and product for purifying air by the removal therefrom of ozone and other air pollutants. A specific object of the present invention is to provide for the alleviation or prevention of weather fleck to plants by a means which is inexpensive, easy to use and long lasting, and which obviates deposition of weather fleck preventives directly upon the plant leaves.

In accordance with the present invention weather fleck damage to plants is prevented or greatly alleviated by providing a shade cloth which is treated with an air purifying agent or a weather fleck preventive in combination with a polymeric binder, namely an elastomer.

FIGURE 1 is a drawing showing a portion of shade cloth with the weather fleck preventive applied thereto; and FIGURE 2 is a sectional view on an enlarged scale taken on a plane indicated by the line 2—2 in FIG. 1 and looking in the direction of the arrows.

A shade cloth is a conventional article of commerce formed of alternating close and open weave stripes indicated, for example, at 10 and 11, respectively, of FIGURE 1. In general the close weave or reinforcing stripes 10 contain from about 50 to about 100 yarns per inch while the open weave stripes 11 contain 8 to 16 yarns per inch, the close weave stripes being spaced longitudinally and/or transversely from 10 to 18 inches apart as shown in FIGURE 1. Typical shade cloths are disclosed, for example, in U.S. Patents Nos. 2,601,326 and 2,974,442. A representative commercial shade cloth is sold under the trade name "Cannon 88."

The weather fleck preventive is a chemical which will react with, absorb, adsorb, or counteract the air pollutants, particularly ozone and peroxygen compounds, to prevent their attack upon plant tissues. Accordingly, such weather fleck preventives have antiozonant or antioxidant properties. Although numerous weather fleck preventives are known to be effective when applied directly to the plant leaves, it was found quite surprisingly that only certain materials could be used satisfactorily in the composition and product of the invention, namely orthophenylenediamine; alkylated diphenylamines having 8 to 9 carbon atoms in the alkyl groups, e.g., octylated and nonylated diphenylamines such as 4,4'-dioctyl diphenylamine; an N,N'-di-sec.-octyl-p-phenylenediamine, e.g., N,N'-di-3-(5-methylheptyl)-p-phenylenediamine and N,N'-di-2-octyl-p-phenylenediamine; zinc dibutyldithiocarbamate; and polymerized 2,2,4-trimethyl-1,2-dihydroquinoline.

The treatment of a shade cloth with a bath of the weather fleck preventive in a solvent or dispersion medium, such as an aqueous or organic solution thereof, is undesirable, because such a treatment results in unsatisfactory deposition of the weather fleck preventive upon the shade cloth. Moreover, such a method of treatment produces a treated shade cloth wherein the weather fleck preventive is readily removed from the shade cloth by rainfall.

In the shade cloth of the invention, on the other hand, the weather fleck preventive is applied to the shade cloth in conjunction with a binder. The binder must be water-insoluble so as not to be removed from the shade cloth by rainfall. The binder must also be one which does not affect the hand or texture of the shade cloth and must not appreciably weaken the strength of the shade cloth. The binder must also provide for the surface release of the weather fleck preventive so that the treated shade cloth provides weather fleck protection during the entire growing season of the plants to be protected. In other words the binder serves as a weather resistant semipermeable reservoir which permits the release and regeneration or blooming to the binder surface of the weather fleck preventive or air purifying agent. The binder is an elastomer, i.e., an elastic rubberlike substance (as a synthetic rubber or a plastic having some of the physical properties of natural rubber), such as butyl rubber, which is a copolymer of isobutylene and isoprene; styrene-butadiene rubber (SBR), which is a copolymer made from butadiene and styrene; nitrile rubber, which is a copolymer of butadiene and acrylonitrile; polybutadiene; polyisoprene; polyisobutylene; acrylate rubbers, which are polymers of acrylic acid esters, e.g., polyethylacrylate; natural rubber; neoprene or polymers of chloroprene; and the like. In compounding the weather fleck preventive with an elastomeric binder, a rubber latex is used rather than a dry rubber for ease in treatment of the shade cloth. The elastomer is unvulcanized.

The treated shade cloth can be prepared by various methods, for example, by stenciling or roll printing the shade cloth with the binder containing the weather fleck preventive. An alternative method of preparation, is the application to the shade cloth of the weather fleck preventive in the water-insoluble binder by spraying, painting, or otherwise depositing the composition thereon.

The flow properties of a composition which is applied after installation of shade cloths in a tobacco field will of necessity differ from those of a composition adapted to be applied in the factory by printing or stenciling. The rheological properties of the composition can be altered to suit the method of application in ways well known to the art, by addition of natural or synthetic flow-property adjustors such as the water-soluble polysaccharides including karaya gum, gum tragacanth and the alginates; water-swelling clays such as bentonite; and among the synthetics, methyl cellulose and salts thereof, carboxymethylcellulose and salts thereof, and salts of the polyacrylates. Other additives facilitating handling of the cloth include dusts, to reduce the tackiness of the antifleck composition in its binder.

The shade cloth is generally coated with from about 2 to about 20 grams of the composition per square foot of shade cloth to provide thereon from about 2 to about 5 parts by weight of the weather fleck preventive in from about 1 to about 2 parts by weight of the water-insoluble binder. The coating is applied to the shade cloth to provide substantially uniformly distributed intermittent deposits of varying thickness, e.g., from about 1 to about 75 mils, of the weather fleck preventive in the water-insoluble binder. Variation in thickness is illustrated, for example, in FIGURE 2 by comparing the spots shown at 15 and 16. The deposits are intermittent and substantially uniformly distributed as shown in FIGURE 1 in order that the shade cloth will not have its hand or strength appreciably affected, in order that the passage of air therethrough is not appreciably interrupted, and further in order that substantially all portions of the polluted air passing through the treated shade cloth are brought in contact with the coating on the shade cloth. The deposits are applied in varying thickness so that the growing plants will be provided with protection throughout their entire growing season. A typical shade cloth would have a polka dot pattern of the weather fleck preventive in the water-insoluble binder such that each polka dot is about a half inch in diameter on 1 and ¼ inch centers for example, as shown at 12 in FIGURE 1. In general, from about 10% to about 70% of the area of the shade cloth should be covered with the fleck-preventive/binder composition, depending on the fleck-preventive used and the thickness of the applied dot or band.

It is thought that the weather fleck preventive provides protection for plants by reacting with or counteracting the air pollutants, particularly ozone, in the air passing through the shade cloth so that the plants are not brought in contact with a deleterious amount of the air pollutants. As the weather fleck preventive is removed from the surface of the water-insoluble binder more weather fleck preventive blooms or rises to the surface of the binder to provide protection for ensuing attacks by air pollutants so that continual protection is provided.

The shade cloth can be used by forming a tent of the shade cloth about the plants to be protected in the field and in greenhouses. Alternatively, the shade cloth can be mounted vertically between various rows of the growing plants. It is particularly necessary for maximum effectiveness that the shade cloth be mounted substantially vertically on the perimeter or the prevailing windward side or sides of the field containing the growing plants in order that the air pollutants will be removed or effectively depleted from the air upon passage through the treated shade cloth so as to provide protection for the plants on the downwind side of the shade cloth.

The amazing utility of the composition and shade cloth treated therewith of the invention is demonstrated by the following illustrative example.

EXAMPLE 1

On July 10 three separate tents sixteen feet square and eight feet high were erected over five rows of fleck-susceptible shade tobacco, strain W-3. The tobacco had been set out on June 16. The tents were sixteen feet apart, and each tent enclosed approximately sixty tobacco plants. The rows of plants were continuous, resulting in 16-foot unshaded sections between the tents and extending beyond the end tents on each side. All the tents were of cotton shade cloth, type "Cannon 88," a commercial shade cloth.

The shade cloth of tent 1 had been coated with a mixture of 3 parts by weight of 4,4'-dioctyl diphenylamine in 2 parts by weight of butyl rubber latex (isobutylene-isoprene copolymer having 1.5 to 2 mol percent residual unsaturation and containing 55% solids—Butyl Latex 80-21 of Enjay Company, Inc.). This weather fleck preventive formulation had been stencil applied in a polka dot pattern at the rate of 1.8 ounces per square yard of cloth, i.e., 5.66 grams per square foot. Each polka dot was about one half inch in diameter, on 1 and ¼ inch centers. The polka dots varied in thickness from about 1 to about 10 mils, depending on whether the dot fell on the loosely woven or the tightly woven portion of the fabric, as indicated for instance in FIGURE 2.

The shade cloth of tent 2, i.e., the control tent, was untreated. The shade cloth of tent 3 was left untreated until after the first weather fleck outbreak. Thereafter on July 24 the side walls of tent 3 were sprayed with an aqueous emulsion of 3 parts by weight of 4,4'-dioctyl diphenylamine in 2 parts by weight of the same butyl rubber latex used for tent 1. This emulsion was applied with a 3 gallon hand sprayer at a rate of approximately 1.8 ounces of weather fleck preventive formulation per square yard of shade cloth, i.e., about 5.66 grams per square foot. The top of the tent was not sprayed.

The unshaded sections of the five rows of tobacco outside the tents remained untreated.

Natural outbreaks of weather fleck were apparent on July 18 and 25. Fleck damage was scored after each outbreak by rating each leaf on each plant on a progressive scale from 0 for no fleck to 5 for severe flecking of the entire leaf. The leaf ratings for all the leaves on a single plant were summed to give the score for that plant, and plant scores were averaged to obtain a plot rating.

*Table I*

FLECK RATINGS ON JULY 24

| Row | Near Tent 1 | Under Tent 1 | Between Tents 1 & 2 | Under Tent 2 | Between Tents 2 & 3 | Under Tent 3 |
|---|---|---|---|---|---|---|
| 1 | 0.0 | 0.0 | 7.2 | 19.9 | 15.1 | 11.8 |
| 2 | 0.7 | 0.0 | 9.1 | 8.7 | 10.1 | 10.2 |
| 3 | 0.5 | 0.0 | 7.6 | 11.8 | 10.1 | 13.2 |
| 4 | 1.0 | 0.0 | 9.6 | 14.4 | 16.2 | 14.8 |
| 5 | 1.4 | 0.0 | 10.8 | 10.6 | 17.7 | 18.0 |
| Average | 0.7 | 0.0 | 8.8 | 11.3 | 13.8 | 13.6 |

*Table II*

FLECK RATINGS ON JULY 26

| Row | Near Tent 1 | Under Tent 1 | Between Tents 1 & 2 | Under Tent 2 | Between Tents 2 & 3 | Under Tent 3 |
|---|---|---|---|---|---|---|
| 1 | 8.9 | 0.0 | 9.5 | 13.2 | 15.4 | 11.3 |
| 2 | 4.5 | 0.0 | 11.3 | 17.2 | 13.1 | 10.1 |
| 3 | 6.1 | 0.0 | 11.7 | 19.7 | 10.0 | 12.3 |
| 4 | 6.7 | 0.4 | 14.0 | 27.0 | 19.9 | 15.1 |
| 5 | 13.9 | 0.6 | 12.3 | 21.7 | 19.3 | 15.6 |
| Average | 8.0 | 0.2 | 11.8 | 19.8 | 15.5 | 12.9 |

The above tables show that after the first outbreak, the plants inside tent 2, i.e., the control tent, had an average fleck score of 11.3. Not only was there no fleck at all on the plants in the stencil coated tent 1, but also this stencil coated shade cloth tent even reduced the amount of fleck on adjacent plants outside the tent. Thus the outside plants between tents 2 and 3 had an average fleck score of 13.8, while comparable plants outside or near stencil coated tent 1 averaged only 0.7. This reduction in weather fleck was most evident in those plants downwind from the stencil coated tent 1, thereby establishing that the polluted air was purified as it passed through this tent of treated shade cloth.

After the first fleck outbreak, fleck in tent 3, at that time still untreated, was as severe as it was in the control tent 2. The effectiveness of spraying the side walls of tent 3 after the first fleck outbreak was assessed by the difference between the first scoring and the second scoring. Inside the control tent 2, the average fleck score of 11.3 increased to 19.8 after the second fleck outbreak. During this period, there was no increase in fleck severity on the plants in tent 3 with the freshly sprayed shade cloth side walls. (A small decrease noted was due to a slight variation in assignment of individual leaf scores.) Within the stencil coated tent 1, only a small amount of fleck appeared, giving an average score of 0.2 at the second scoring.

Very little fleck occurred during August. Many lower leaves became dried and fleck could no longer occur on them, so they were removed on August 16 to prevent natural loss.

Fleck was rated again on September 1 for rows 1, 3 and 5 only with the results shown in Table III below. Since some of these leaves were flecked at the time of the July 26 reading, these data do not all represent new fleck. Neither do they represent total fleck, because many of the flecked leaves had been removed. Total fleck was calculated by adding the July 26 scores for the picked leaves to the September 1 scores, assuming that negligible fleck had occurred between the July 26 rating and the August 16 removal of the leaves. These totals are presented in Table IV below. New fleck, most of it occurring on August 27, was obtained by subtracting the July 26 ratings from the total fleck value of Table IV with the results shown in Table V.

*Table III*

FLECK RATINGS ON SEPTEMBER 1 ON UNPICKED LEAVES

| Row | Near Tent 1 | Under Tent 1 | Between Tents 1 & 2 | Under Tent 2 | Between Tents 2 & 3 | Under Tent 3 |
|---|---|---|---|---|---|---|
| 1 | 0.8 | 4.4 | 5.6 | 11.9 | 10.9 | 6.6 |
| 3 | 0.9 | 1.0 | 3.8 | 6.1 | 0.7 | 5.2 |
| 5 | 7.9 | 2.5 | 3.7 | 10.1 | 3.1 | 1.4 |
| Average | 3.2 | 2.6 | 4.4 | 9.4 | 4.9 | 4.4 |

*Table IV*

TOTAL FLECK ON SEPTEMBER 1

| Row | Near Tent 1 | Under Tent 1 | Between Tents 1 & 2 | Under Tent 2 | Between Tents 2 & 3 | Under Tent 3 |
|---|---|---|---|---|---|---|
| 1 | 10.1 | 4.4 | 15.4 | 22.6 | 20.8 | 15.8 |
| 3 | 6.8 | 1.0 | 13.8 | 23.5 | 10.1 | 14.3 |
| 5 | 20.1 | 2.9 | 14.5 | 29.5 | 21.1 | 15.7 |
| Average | 12.3 | 2.8 | 14.6 | 25.2 | 17.3 | 15.3 |

*Table V*

NEW FLECK BETWEEN JULY 26 AND SEPTEMBER 1

| Row | Near Tent 1 | Under Tent 1 | Between Tents 1 & 2 | Under Tent 2 | Between Tents 2 & 3 | Under Tent 3 |
|---|---|---|---|---|---|---|
| 1 | 1.2 | 4.4 | 5.9 | 9.4 | 5.4 | 4.5 |
| 3 | 0.7 | 1.0 | 2.1 | 3.8 | 0.1 | 2.0 |
| 5 | 6.2 | 2.3 | 2.2 | 7.8 | 1.8 | 0.1 |
| Average | 2.7 | 2.6 | 3.4 | 7.0 | 2.4 | 2.2 |

The relatively small increase of fleck on plants between the tents is due largely to the August drought conditions wherein plants in the open were dried and more resistant to fleck than those under the tents. Comparison of the average fleck data in Table V of the plants under the tents shows that there was more than double the amount of fleck under the control tent 2 compared to that in pretreated tent 1 or sprayed tent 3.

A severe thunderstorm with high winds on September 1 flattened most of the tobacco and tore up most of the tent cloths, terminating the experiment.

The data in the above tables establishes that both printing of shade cloth before it is installed and spray applications of the fleck-resisting chemical in a suitable binder to shade cloth already installed surrounding fleck-susceptible tobacco plants protected such tobacco from fleck for the greater part of the growing season.

EXAMPLE 2

As a result of the above observation that plants outside and downwind of treated shade cloth tents were also protected from fleck, a single wall of variously treated cloths was erected on August 2 on the southeast side of five rows of fleck susceptible Connecticut 49 shade tobacco grown without shade in rows running southwest to northeast. After one slight fleck outbreak, it was determined that there was very little fleck close to cloth spray treated with 1.8 ounces per square yard (5.66 grams per square foot) of 4,4'-dioctyl-diphenylamine in the same butyl latex binder used in Example 1 in proportions of 3:2. There was moderate fleck near two replications of cloth treated with 1.2 ounces per square yard (3.77 grams per square foot) of the same composition stenciled on in an intermittent pattern of dots. Heaviest fleck was noted near untreated cloth. Five rows out from the cloth there was little difference in fleck among the various treatments. Individual leaf scores were not made.

EXAMPLES 3 TO 8

Several materials which had proved effective against ozone damage in foliar applications to tomato plants were applied to shade cloth and then exposed in an ozone chamber.

A cubical chamber measuring approximately five feet in each direction was equipped with a refrigeration unit, an air intake through which air containing 0.55 to 0.65 part per million of ozone could be admitted from an ozone generator, a Mast ozone recorder (from Mast Development Corporation of Davenport, Iowa), and an outlet through which air was exhausted to the outside. Inside the chamber was placed a three-foot cubical wooden frame covered on five sides with one thickness of shade cloth treated with fleck preventive/latex composition. The sixth, or uncovered, side of the "tent" was positioned flat against the bottom of the ozone chamber over both the ozone sensing device and the air outlet.

In conducting the test, a steady ozone/air concentration was first established by adjusting the rate of air flow through the ozone generator until the Mast ozone recorder was steady at 0.55 to 0.65 p.p.m. ozone. Then the shade cloth covered tent was positioned in the chamber and the test conducted by introducing ozone-containing air into the space between the walls of the ozone chamber and the shade cloth covered walls of the test tent. The ozone-containing air diffused freely through the shade cloth and its concentration therein was determined by the Mast ozone recorder. Temperature was held between 75° F. and 85° F. It was noted that the ozone concentration within the treated tent remained at a very low level for some time, showing that the composition of the invention was removing ozone from the air as it passed through the treated cloth. The time for the ozone concentration to rise to 0.05 p.p.m., which is the threshold concentration producing weather fleck, was recorded for each test composition.

Several formulations prepared from 40% SBR latex 2000 (Naugatex 2000 from Naugatuck Chemical Division of The United States Rubber Company, made from butadiene monomer and styrene monomer in a charge ratio of 54% by weight to 46% by weight; the latex contains 40% solids) and commercially available dispersions or emulsions of several test anti-weather fleck agents were deposited in a pattern of dots on Cannon shade cloth. Formulations were also prepared from 55% butyl latex (Enjay Butyl Latex 80–21 of Enjay Company Inc. which is an isobutylene/isoprene copolymer having 1.5–2.0 mol percent residual unsaturation, and containing 55% solids) with several fleck-preventing agents and deposited on Cannon shade cloth like the SBR formulations. Results of these data are summarized as follows:

| Example No. | Rate of Appln. (g./ft.²) | Rubber Latex | | | Fleck Preventive Agent | | | Time to Exhaust (hrs.) |
|---|---|---|---|---|---|---|---|---|
| | | Type | Dry, Percent | Wet Parts | Name | Dry, percent | Wet Parts | |
| 3 | 2.44 | SBR | 25 | 50 | Agerite Resin D¹ 55% | 75 | 109 | 2 |
| 4 | 1.67 | SBR | 25 | 50 | Butyl Zimate ² 50% | 75 | 120 | 4 |
| 5 | 3.7 | SBR | 40 | 100 | Agerite Stalite ³ 60% | 60 | 100 | 168 |
| 6 | 2.31 | SBR | 40 | 100 | UOP 288 ⁴ 65% | 60 | 92.4 | 312+ |
| 7 | 3.53 | Butyl | 40 | 72.8 | Agerite Stalite ³ 60% | 60 | 100 | 96+ |
| 8 | 2.2 | Butyl | 40 | 72.8 | UOP 288 ⁴ 65% | 60 | 92.3 | 312+ |

¹ A 55% dispersion of polymerized 2,2,4-trimethyl-1,2-dihydroquinoline.
² A slurry of 50% zinc dibutyldithiocarbamate solid in water.
³ A 60% emulsion of commercial mixture of octylated diphenylamines.
⁴ A 65% emulsion of N,N'-di-sec.-octyl-p-phenylenediamine of Universal Oil Products.

EXAMPLE 9

During the performance of these tests, it was observed that the ozone liberated into the room through the exhausts from the ozone chamber and the ozone generator manifested itself by odor and by causing eye and throat irritation to laboratory personnel. Shade cloth treated with Agerite Stalite/butyl latex composition was crumpled and placed in the exhaust pipes so that air travelling through said exhaust pipes had to travel through 6 to 12 thicknesses of the cloth. Ozone in the effluent air was decreased to the point where it was no longer detectable by odor or by irritation of mucous membranes.

Comparable results are also obtained by using shade cloth treated with the other weather fleck preventives and the other water-insoluble elastomers.

It is therefore evident that the treated shade cloth of the invention provides for the first time a highly effective, long lasting, inexpensive and non-residual protection to various plants against damage by weather fleck.

The composition of the invention can be used in conjunction with any supporting member therefor, for example, in air filters for greenhouses, air conditioners, or machinery liberating ozone.

It will be appreciated that various modifications and changes may be made in the composition and product of the invention in addition to those set forth above without departing from the spirit of the invention and accordingly the invention is to be limited only within the scope of the appended claims.

What is claimed is:

1. An air purifying composition comprising from about 2 to about 5 parts by weight of a purifying agent selected from the group consisting of orthophenylenediamine, alkylated diphenylamines having 8 to 9 carbon atoms in the alkyl groups, N,N'-di-sec.-octyl-p-phenylenediamine, zinc dibutyldithiocarbamate and polymerized 2,2,4-trimethyl-1,2-dihydroquinoline in from about 1 to about 2 parts by weight of an unvulcanized water-insoluble elastomer, which elastomer serves as a weather resistant semi-permeable reservoir permitting the release and regeneration of the purifying agent upon exposure of the composition to air containing ozone and other air pollutants.

2. A composition as set forth in claim 1 wherein the water-insoluble elastomer is butyl rubber.

3. A composition as set forth in claim 1 wherein the water-insoluble elastomer is styrenebutadiene rubber.

4. A composition as set forth in claim 1 wherein the purifying agent is N,N'-di-sec.-octyl-p-phenylenediamine.

5. A composition as set forth in claim 1 wherein the purifying agent is an octylated diphenylamine.

6. An air purifying composition comprising from about 2 to about 5 parts by weight of an octylated diphenylamine purifying agent in from about 1 to about 2 parts by weight of unvulcanized butyl rubber, which butyl rubber serves as a weather resistant semi-permeable reservoir permitting the release and regeneration of the purifying agent upon exposure of the composition to air containing ozone and other air pollutants.

7. An air purifying composition comprising from about 2 to about 5 parts by weight of N,N'-di-sec.-octyl-p-phenylenediamine purifying agent in from about 1 to about 2 parts by weight of unvulcanized butyl rubber, which butyl rubber serves as a weather resistant semi-permeable reservoir permitting the release and regeneration of the purifying agent upon exposure of the composition to air containing ozone and other air pollutants.

8. An air purifying unit comprising the composition of claim 1 coated upon a supporting member adapted to be mounted in the vicinity of organisms and materials subject to ozone damage.

9. A shade cloth formed of alternating close and open weave stripes having coated thereon from about 2 to about 20 grams per square foot of shade cloth of substantially uniformly distributed intermittent deposits of a thickness varying from about 1 to about 75 mils of the composition of claim 1.

10. A shade cloth formed of alternating close and open weave stripes having coated thereon from about 2 to about 20 grams per square foot of shade cloth of substantially uniformly distributed intermittent deposits of a thickness varying from about 1 to about 75 mils of the composition of claim 6.

11. An air purifying unit comprising the composition of claim 1 coated upon a supporting member adapted to be mounted in the vicinity of but not in contact with organisms and materials subject to ozone damage.

12. An open weave fabric permitting air to pass through the fabric mesh having coated thereon the composition of claim 1 and adapted to be used in the vicinity of but not in contact with growing vegetation.

(References on following page)

References Cited in the file of this patent

UNITED STATES PATENTS

| | | |
|---|---|---|
| 2,197,929 | Hale | Apr. 23, 1940 |
| 2,203,274 | Anderson | June 4, 1940 |
| 2,601,326 | Rohs | June 24, 1952 |
| 2,798,820 | Nelson | July 9, 1957 |
| 2,832,753 | Weinberg | Apr. 29, 1958 |
| 2,974,442 | Womelsdorf | Mar. 14, 1961 |

OTHER REFERENCES

Hackh's Chemical Dictionary, third ed., Philadelphia, Blakiston, 1944, page 295.

Condensed Chemical Dictionary, fifth ed., New York, Reinhold, 1956, pages 192, 193, 1189.

Heggestad, H. E., et al.: Ozone in High Concentrations as Cause of Tobacco Leaf Injury; in Science (Magazine), 129 (3343); pages 208, 209; Jan. 23, 1959.

Kilbourne, H. W., et al.: Chemical Inhibition of Ozone Degradation of SBR; in Rubber Chemistry and Technology, 32 (4); pages 1155–1163. Oct.–Nov. 1959.

Rich, S., et al.: Antiozonants to Protect Plants from Ozone Damage; in Science (Magazine), 132 (3420); pages 150, 151; July 15, 1960.

Berstrom, E. W.: Ozone Resistance of Butyl Vulcanizates; in Chemical Abstracts, vol. 56, column 11,766; May 14, 1962.